US008235241B2

(12) United States Patent
Ramsay

(10) Patent No.: US 8,235,241 B2
(45) Date of Patent: Aug. 7, 2012

(54) FLOATING ABSORBER ASSEMBLY FOR REDUCED FUEL SLOSH NOISE

(75) Inventor: Thomas N. Ramsay, Worthington, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1355 days.

(21) Appl. No.: 11/859,005

(22) Filed: Sep. 21, 2007

(65) Prior Publication Data
US 2009/0078705 A1    Mar. 26, 2009

(51) Int. Cl.
*B65D 33/00*   (2006.01)
(52) U.S. Cl. ........ 220/563; 220/562; 220/216; 220/4.14
(58) Field of Classification Search ................. 220/562, 220/563, 216, 88.1, 218, 219, 4.12, 4.14
See application file for complete search history.

(56) References Cited

U.S. PATENT DOCUMENTS

| | | | | |
|---|---|---|---|---|
| 2,687,343 A * | 8/1954 | Crask et al. | .................... | 422/139 |
| 2,840,259 A * | 6/1958 | Steidl | ............................ | 220/563 |
| 2,860,809 A * | 11/1958 | Perry | ............................ | 220/563 |
| 3,294,278 A | 12/1966 | Madden et al. | | |
| 3,349,953 A * | 10/1967 | Conaway et al. | ............. | 220/734 |
| 3,366,266 A * | 1/1968 | Heartstedt | ..................... | 220/216 |
| 3,443,584 A * | 5/1969 | Evensen et al. | ............... | 137/582 |
| 3,508,578 A * | 4/1970 | Brooks et al. | ................. | 137/582 |
| 3,610,457 A * | 10/1971 | Opalewski | ..................... | 220/563 |
| 3,650,431 A * | 3/1972 | Stewart | ........................ | 220/88.1 |
| 3,687,329 A * | 8/1972 | Baum | ............................ | 220/216 |
| 3,784,050 A * | 1/1974 | Pollack | ......................... | 220/734 |
| 3,804,292 A * | 4/1974 | Chiti | ............................ | 220/88.3 |
| 3,822,807 A * | 7/1974 | MacDonald et al. | ........ | 220/88.1 |
| 3,919,373 A | 11/1975 | Kormendi | | |
| 3,995,541 A * | 12/1976 | Coyle et al. | .................... | 454/91 |
| 4,299,305 A * | 11/1981 | Eriksson | ........................ | 181/230 |
| 4,467,485 A * | 8/1984 | Hall | ................................. | 5/684 |
| 4,550,848 A * | 11/1985 | Sucato | .......................... | 220/501 |

(Continued)

FOREIGN PATENT DOCUMENTS

DE    19650415    6/1998

(Continued)

OTHER PUBLICATIONS

Computer generated translation of DE 19650415, 3 pages.

*Primary Examiner* — Anthony Stashick
*Assistant Examiner* — Christopher McKinley
(74) *Attorney, Agent, or Firm* — Mark E. Duell; Rankin Hill & Clark LLP

(57) ABSTRACT

A liquid tank assembly for a motor vehicle includes a tank and an absorber assembly. The tank has an inner surface defining a cavity for receiving a liquid substance. The absorber assembly is disposed within the cavity for dampening liquid sloshing noises. The absorber assembly includes a plurality of connected dampener elements. End sections of the absorber assembly are attached to the inner surface of the tank. The absorber assembly is configured to float on a surface of the liquid when a volume of liquid within the tank is between a first critical volume and a second, lower critical volume. The absorber assembly is generally submerged when a volume of liquid within the tank is a generally greater than the first critical volume. The absorber assembly is generally suspended within the cavity when a volume of liquid within the tank is a generally lower than the second critical volume.

20 Claims, 3 Drawing Sheets

U.S. PATENT DOCUMENTS

| | | | |
|---|---|---|---|
| 4,611,724 A * | 9/1986 | Watkins et al. | 220/562 |
| 4,764,408 A | 8/1988 | Stedman et al. | |
| 4,844,278 A * | 7/1989 | Freiwald et al. | 220/563 |
| 4,891,000 A | 1/1990 | Ishii | |
| 4,974,743 A * | 12/1990 | Sasaki et al. | 220/694 |
| 5,031,795 A | 7/1991 | Kotera et al. | |
| 5,194,212 A | 3/1993 | Bonnett | |
| 5,303,843 A | 4/1994 | Zink et al. | |
| 5,308,573 A * | 5/1994 | Hirakawa | 264/516 |
| 5,398,840 A * | 3/1995 | Luhman et al. | 220/563 |
| 5,531,075 A * | 7/1996 | Behringer et al. | 62/46.1 |
| 5,647,503 A | 7/1997 | Steele et al. | 220/589 |
| 5,888,393 A * | 3/1999 | Luhman et al. | 210/510.1 |
| 5,890,618 A | 4/1999 | Spickelmire | |
| 6,062,417 A * | 5/2000 | Evans | 220/563 |
| 6,308,856 B1 * | 10/2001 | Spickelmire | 220/563 |
| 6,499,620 B1 * | 12/2002 | Salliot et al. | 220/563 |
| 6,568,556 B1 * | 5/2003 | Kahler et al. | 220/563 |
| 6,595,382 B2 * | 7/2003 | Ettlinger | 220/560.11 |
| 6,786,350 B2 | 9/2004 | Bauer | |
| 6,848,472 B2 * | 2/2005 | Bambacigno | 137/574 |
| 6,966,401 B2 * | 11/2005 | Kojima | 181/233 |
| 2001/0009257 A1 * | 7/2001 | Bauer | 220/563 |
| 2001/0015513 A1 | 8/2001 | Schaftingen et al. | |
| 2004/0134916 A1 * | 7/2004 | Bambacigno | 220/563 |
| 2004/0173616 A1 | 9/2004 | Krogull | |

FOREIGN PATENT DOCUMENTS

| | | |
|---|---|---|
| EP | 0413609 | 4/1993 |
| JP | 61089824 | 8/1986 |
| JP | 2000211382 | 2/2000 |

* cited by examiner

FLOATING ABSORBER ASSEMBLY FOR REDUCED FUEL SLOSH NOISE

BACKGROUND

The present disclosure generally relates to a fluid tank, such as a fuel tank, for a motor vehicle. More particularly, the present disclosure relates to a floating absorber assembly disposed in a fuel tank for reducing fuel slosh noise.

Sloshing noises that originate inside a fluid tank of a motor vehicle, such as a fuel tank, are generally due to the movement of liquid (e.g., fuel) that occurs during driving. In a vehicle's fuel tank, this sloshing noise can sometimes be heard inside the vehicle's passenger cabin, particularly at certain critical fuel volumes, and is considered a nuisance.

Historically, vehicle fuel tanks were made of steel. Noise or fuel slosh reducing baffles, including vertically-oriented absorbers, are more easily incorporated into steel fuel tanks for purposes of inhibiting the formation of waves within the fuel tank thereby reducing or eliminating noise or fuel slosh within the tank. More recently, many vehicle fuel tanks have been made of plastic, particularly in the U.S. where plastic fuel tanks are mandated. The incorporation of baffles or absorbers within plastic fuel tanks, particularly blow-molded plastic tanks, is difficult due to manufacturability problems and reduced fuel volume concerns.

Nonetheless, many dampener or baffle elements of various designs have been employed in the fuel tank in an attempt to prevent or reduce fuel sloshing noises. For example, it is known to locate inside a fuel tank dampener elements that float on the fuel surface. These dampener elements have a freely floating element whose surface is equipped with a dampening material, for example, a knitted fabric that has open pores. These dampener elements are provided for obstructing waves and currents in the tank in an effort to act directly as noise dampeners.

It is also known to locate at the interior walls of the fuel tank baffle elements to cause a reduction of the energy of the impinging fuel waves and thereby reduce impact noise. One such baffle design includes a corrugated plastic sheet molded with numerous slits which, when expanded, form meshes that serve as voids to entrap air and dissipate the energy of the fuel waves. In another design, the baffle element includes a sheet made from a large number of synthetic resin or plastic fibers that are mixed and entangled with one another, forming numerous energy dissipating voids. In yet another design, the dampener consists of a three-dimensional structured plastic insert whose structure forms small fuel wave calming chambers.

As indicated previously, at certain critical fuel volumes, particularly at a low fuel volume, not only does the amplitude of the waves causing the sloshing noise increase, but the resonance volume in the fuel tank also increases. This can cause the sloshing noise to become particularly loud. Baffles which are attached as impact elements at interior walls would have to cover nearly the entire fuel tank surface to have any chance of being effective. This approach is cumbersome, work-intensive and expensive, especially inside a plastic fuel tank where the only access to the interior of the tank is typically through a single opening for the fuel pump. Free floating dampener elements have a less complicated design and can be accommodated in fuel tanks with varying shapes if necessary. However, they can require a relatively large amount of space to be effective, which unnecessarily restricts the filling capacity of the fuel tank. In any case, there is a need for an improved absorber assembly for a fuel tank for reducing fuel slosh noise at critical fuel volumes.

BRIEF DESCRIPTION

In accordance with one aspect, a liquid tank assembly for a motor vehicle comprises a tank and an absorber assembly. The tank has an inner surface defining a cavity for receiving a liquid substance. The absorber assembly is disposed within the cavity for dampening liquid sloshing noises. The absorber assembly includes a plurality of connected dampener elements. End sections of the absorber assembly are attached to the inner surface of the tank. The absorber assembly is configured to float on a surface of the liquid when a volume of liquid within the tank is between a first critical volume and a second, lower critical volume. The absorber assembly is generally submerged when a volume of liquid within the tank is a generally greater than the first critical volume. The absorber assembly is generally suspended within the cavity when a volume of liquid within the tank is a generally lower than the second critical volume.

In accordance with another aspect, an absorber assembly for a fuel tank of a motor vehicle for reducing fuel slosh noise comprises a plurality of dampener elements for mitigating surface wave propagation. The plurality of dampener elements are linked together to form a matrix of dampener elements. The absorber assembly is suspended within a cavity defined by an inner surface of the tank such that the absorber assembly is spaced from the tank inner surface. The dampener elements have a specific density smaller than that of the fuel in the tank so as to float on a surface of the fuel at critical fuel volumes.

In accordance with yet another aspect, an absorber assembly for a fuel tank of a motor vehicle for reducing fuel slosh noise comprises a plurality of generally spherical, interconnected dampener elements. The dampener elements have a mat-like configuration tethered within a cavity defined by an inner surface of the fuel tank to mitigate surface wave propagation. A plurality of tethers attach the interconnected dampener elements to side portions of the tank inner surface. The tethers prevent the dampener elements from contacting the side portions and allow the dampener elements to float on the fuel surface when a volume of fuel within the tank is between a first critical fuel volume and a second, lower critical fuel volume. The absorber assembly is generally submerged when a volume of liquid within the tank is a generally greater than the first critical volume. The absorber assembly is generally suspended within the cavity when a volume of liquid within the tank is a generally lower than the second critical volume.

DETAILED DESCRIPTION

Figure 1:
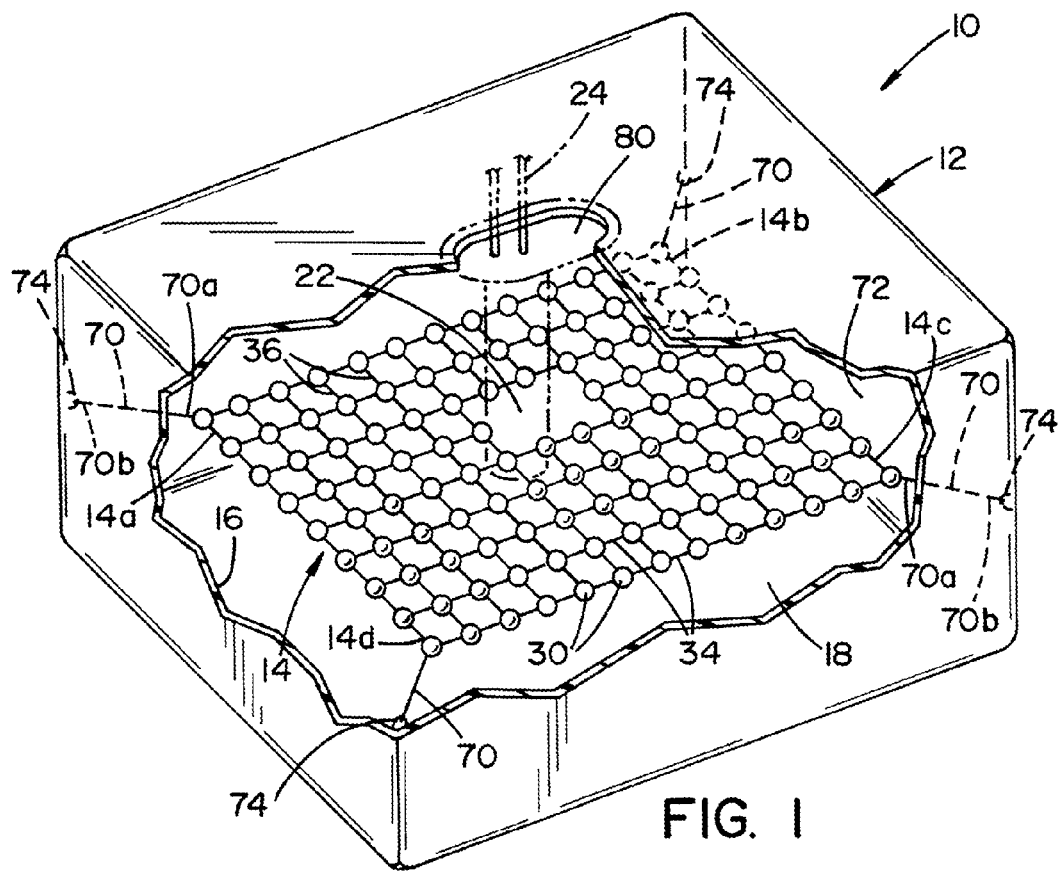
FIG. 1 is a perspective view, partially broken away, of a liquid tank assembly for a motor vehicle including a tank and an absorber assembly.

It should, of course, be understood that the description and drawings herein are merely illustrative and that various modifications and changes can be made in the structures disclosed without departing from the present disclosure. It will also be appreciated that the various identified components of the absorber assembly disclosed herein are merely terms of art that may vary from one manufacturer to another and should not be deemed to limit the present disclosure. All references to direction and position, unless otherwise indicated, refer to the orientation of the absorber assembly illustrated in the drawings and should not be construed as limiting the claims appended hereto.

Figure 3:
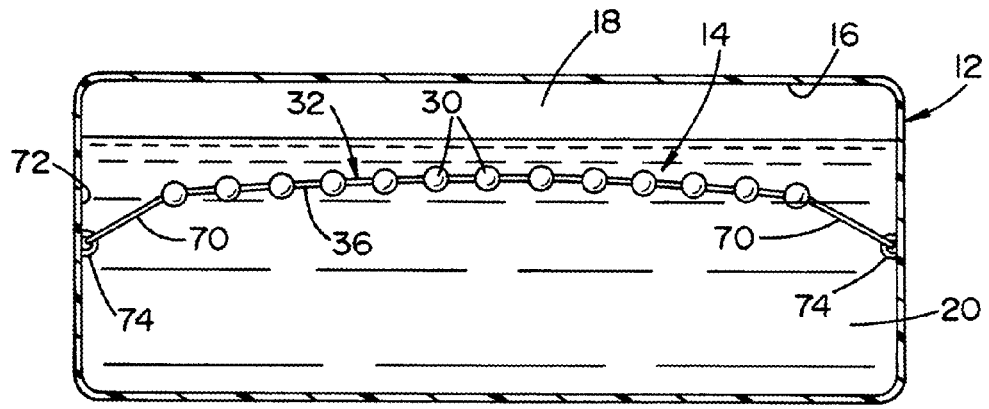
FIG. 3 is a schematic cross-sectional view of the tank and absorber assembly of FIG. 1 showing the absorber assembly generally submerged in a volume of liquid generally greater than a first critical liquid volume.
Figure 4:
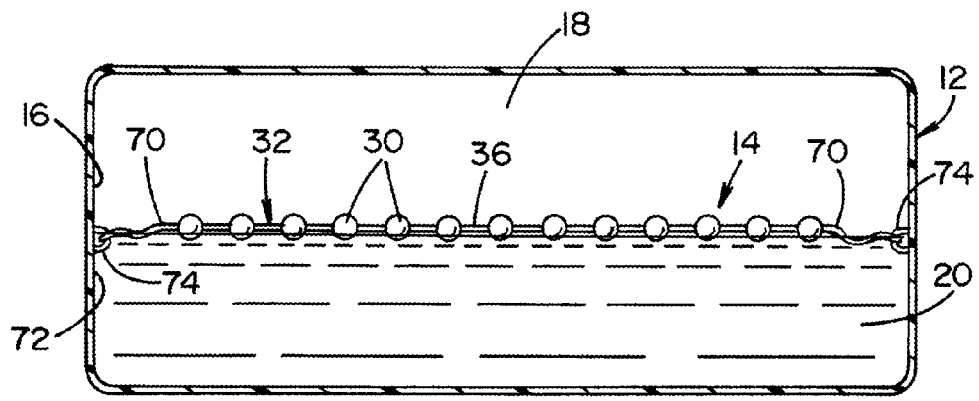
FIG. 4 is a schematic cross-sectional view of the tank and absorber assembly of FIG. 1 showing the absorber assembly floating on a surface of the liquid when a volume of liquid is between the first critical volume and a second, lower critical volume.
Figure 5:
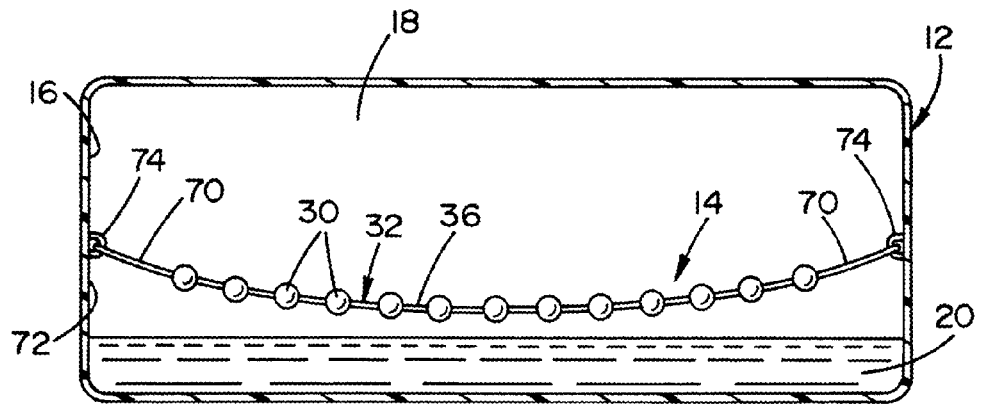
FIG. 5 is a schematic cross-sectional view of the tank and absorber assembly of FIG. 1 showing the absorber assembly generally suspended when a volume of liquid is a generally lower than the second critical volume.

Referring now to the drawings, wherein like numerals refer to like parts throughout the several views, FIG. 1 illustrates a liquid tank assembly 10 for an associated motor vehicle (not shown). The liquid tank assembly generally comprises a tank 12 and an absorber assembly 14 having a mat-like, net-like, lattice, mesh, matrix or like configuration. The tank has an inner surface 16 defining a cavity 18 for receiving a liquid substance, such as diesel fuel or gasoline fuel 20 (FIGS. 3-5). The absorber assembly 14 is disposed within the cavity 18 for dampening liquid sloshing noises, and can include at least one cutout 22 for positioning the absorber assembly around at least one internal part 24 of the fuel tank. Although the tank 12 is illustrated as having a generally rectangular cross-sectional shape, it should be appreciated that the tank can have a curved or polygonal cross-sectional shape. It should also be appreciated that the configuration of the absorber assembly 14 can have an irregular design, and an outer contour of the absorber assembly may also be designed to adjust to the contours of the tank 12.

Figure 2:
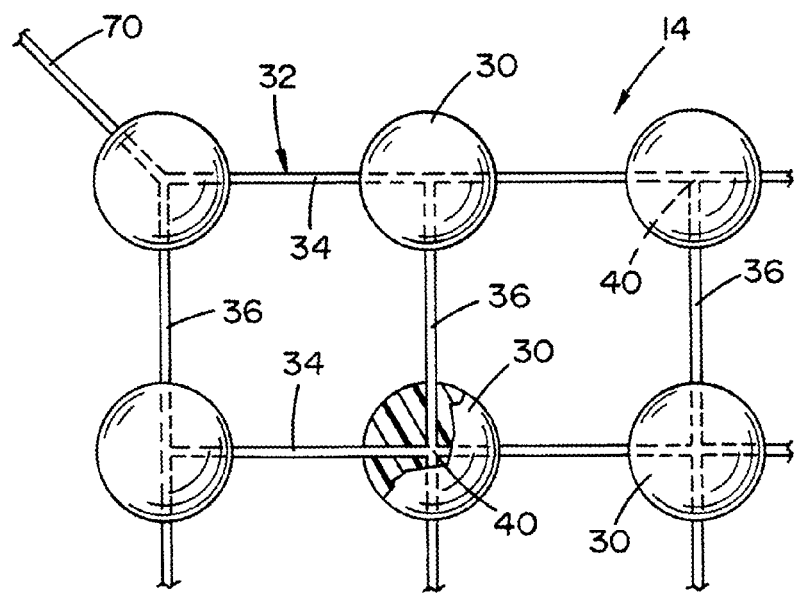
FIG. 2 is an enlarged, partial perspective view, partially broken away, of the absorber assembly of FIG. 1.

With additional reference to FIG. 2, the absorber assembly 14 can include a plurality of connected, three-dimensional dampener elements 30 for mitigating surface wave propagation. The dampener elements 30 are linked together by a web or base 32, which can include a plurality of spaced apart first members 34 interconnected with a plurality of spaced apart second elongated members 36. The first and second member can be flexible; although, this is not required. In the depicted embodiment, the first elongated members 34 and second elongated members 34 are oriented approximately normal relative to each other. Although, it should be appreciated that the first and second elongated members can be orientated at some other angle (e.g., an acute angle) relative to each other. The first and second elongated members 34, 36, respectively, can be integrally formed.

Each dampener element of the plurality of dampener elements 30 can be secured at an intersection 40 between one of the first elongated members 34 and one of the second elongated members 36; although, this is not required. As shown in FIG. 2, the dampener elements 30 can be molded to or integrally formed with the base 32. Thus, the absorber assembly 14 can be a unitary molded product. In use, the liquid 20 contained in the tank 12 can move considerably, such as when the vehicle starts, decelerates, turns, etc. As the liquid engages the absorber assembly 14, the energy of waves of the liquid is dissipated by the dampener elements 30. As a result, a force with which the liquid impinges upon the inner surface 16 of the tank 12 is considerably decreased. This, in turn, suppresses the level of sound owing to this impingement, such as liquid sloshing noises.

In the illustrated embodiment, each dampener element 30 is generally spherical in shape. Although, it should be appreciated that various other shapes and configurations of the dampener elements can be used without departing from the scope of the present disclosure. Further, the dampener elements 30 do not all have to be the same size or have the same shape. The dampener elements 30 can be solid structures having no openings for fluid flow therethrough or could take on some other configuration.

The dampener elements 30 can be fabricated of a tough, synthetic plastic material, such as polypropylene or polyethylene. However, any one of a number of different materials may be utilized, with no one material in particular being required to practice the invention. For example, nylon, stainless steel or other composite materials may be used. Whatever material is used, such material should be relatively impervious to the fuel blends contained within the tank 12 and would include resiliency or spring-like properties that would be more desirable for the desired energy absorbing effect. Further, and as will be discussed in greater detail below, the plurality of dampener elements 30 has a specific density smaller than that of the liquid 20 in the tank 12 so as to float on the surface of the liquid at critical liquid volumes.

Alternatively, at least a portion of at least one dampener element of the plurality of dampener elements 30 can be formed of a material which is generally permeable to liquid flow to dampen the liquid sloshing noises. More particularly, as the liquid 20 within the tank 12 engages the absorber assembly 14, the liquid can at least partially pass through the permeable material of at least one dampener element 30. As the liquid passes through the dampener element, the energy of waves of the liquid is dissipated and the waves disappear or at least decrease.

Figure 6:
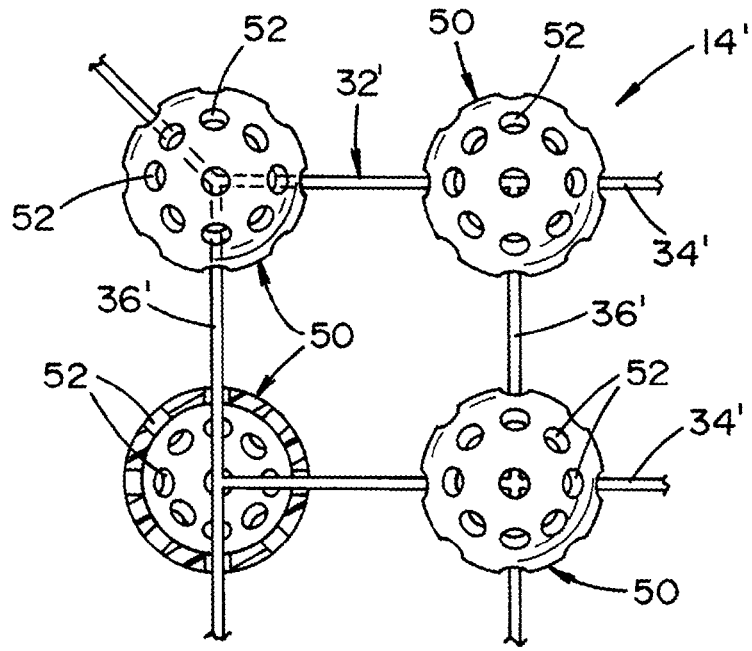
FIG. 6 is an enlarged, partial perspective view, partially broken away, of an alternate absorber assembly.

An alternate embodiment of an absorber assembly 14' is illustrated in FIG. 6. In this embodiment, dampener elements 50 of the absorber assembly 14' can be perforated. For example, the perforated dampener element 50 can be in the form of a thin-walled, generally spherical shell having a plurality of generally uniformly distributed circular openings 52. It should be appreciated that the dampener elements openings 52 may by any shape, such as a triangular shape or square shape. Again, it should also be appreciated that while the configurations for the illustrated dampener elements are generally spherical, they may be any one of a number of different configurations, such as square, rectangular, pyramid shaped, or the like. Similar to the previously described embodiment, each dampener element 50 can be secured to a base 32' of the absorber assembly 14' via conventional manners. In use, the liquid contained in the tank engages the absorber assembly 14' and passes through the openings 52 of the dampener elements 50. During the process of passing through the openings 52, the energy of waves of the liquid is dissipated which, in turn, dampens liquid sloshing noises.

Figure 7:
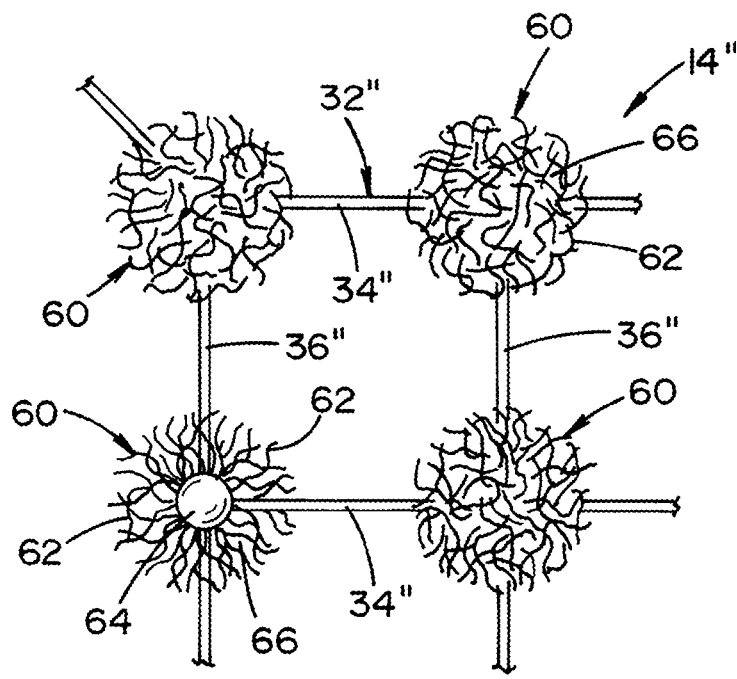
FIG. 7 is an enlarged, partial perspective view, partially broken away, of another alternate absorber assembly.

Another alternate embodiment of an absorber assembly 14" is illustrated in FIG. 7. In this embodiment, dampener elements 60 of the absorber assembly 14" can be formed of a number of synthetic, intermingled fibers 62. The fibers can extend from a core 64, which can be secured at an intersection between interconnected first and second elongated members 34" and 36", respectively, of an absorber assembly base 32". For example, the core 64 of each dampener element 60 can be integrally formed with or molded to the base 32". The synthetic fibers 62 can be curved or curled and intermingled to define a great number of voids 66. The material of the synthetic fibers 62 may be polypropylene or polyethylene or nylon or the like. Again, when a motor vehicle is moving, the fuel within the tank can move considerably. Thus, the fuel engages the absorber assembly 14" and passes through the number of voids 66 of each dampener element 60. During the process of passing through the voids, the energy of waves is dissipated and the waves disappear or at least decrease. Since air is entrapped in some of the voids 66 during the impingement of the fuel with the absorber assembly, the entrapped air works effectively to eliminate waves.

With reference again to FIG. 1, end sections 14a, 14b, 14c, 14d of the absorber assembly 14 are attached to the inner surface 16 of the tank 12. More particularly, the absorber assembly 14 further comprises generally resilient connecting members or tethers 70 for attaching the end sections 14a-d of the absorber assembly to side portions 72 of the inner surface 16 of the tank 12. In the depicted embodiment, each connecting member 70 includes a first end section 70a connected to an outermost dampener element (a corner dampener element in the illustrated embodiment) and a second end section 70b connected to a latching mechanism 74 mounted to the inner surface 16. This allows the absorber assembly 14 to be fully expanded (as shown) within the tank cavity 18. In the illustrated embodiment, the latching mechanisms 74 are eyelets integrally formed on the inner surface 16. It should be appreciated that other latching mechanisms are also contemplated. Additionally, or alternatively, the absorber assembly 14 could also be bonded to the inner surface of the fuel tank. As shown in FIG. 2, the connecting members can be integrally formed with the base 32; although, this is not required.

The connecting members 70 are configured to suspend the absorber assembly within the tank cavity 18 and prevent the absorber assembly 14 from engaging the inner surface 16 of the tank 12. As shown in FIG. 4, each connecting member 70 has a predetermined length and/or flexibility or tension which only allows the absorber assembly 14 to float on the liquid surface when a volume of liquid 20 within the tank is at or between a first critical volume and a second, lower critical volume. The first critical volume can be defined as the maximum volume of fuel in the tank 12 at which the assembly 14 can still at least partially float on a surface of the fuel. The second critical volume can be defined as the minimum volume of fuel in the tank 12 at which the assembly 14 can still at least partially flow on a surface of the fuel. When the liquid 20 is at one of or between the critical volumes, and the liquid becomes agitated, due to motion of the associated motor vehicle, the absorber assembly 14, particularly the dampener elements 30, act as individual baffles having a dampening effect upon fluid flow throughout the tank in all directions. A substantial portion of the kinetic energy which may be induced in the contained fuel due to motion of the tank 12 is thus absorbed in the absorber assembly 14.

As shown in FIG. 3, due to the predetermined length and/or flexibility or tension of each connecting member 70, the absorber assembly is generally submerged when a volume of liquid 20 within the tank 14 is a generally greater than the first critical volume. In this instance, the absorber assembly 14 can still mitigate surface wave propagation. As shown in FIG. 5, the absorber assembly 14 is generally suspended within the cavity 18 when a volume of liquid 20 within the tank 12 is a generally lower than the second critical volume. As shown in the illustrated embodiment, the connecting members 70 can be sized so as to prevent the base 32 and any of the dampener elements from contacting the inner surface 16 of the tank 12. Particularly, the predetermined length and/or tension of the connecting members further prevents the absorber assembly from contacting top, bottom and side portions of the inner surface of the tank.

The absorber assembly 14 can be designed as a component which is to be manufactured separately from the fuel tank 12 and fitted through an installation opening 80 of the fuel tank. For example, the absorber assembly can be rolled up during installation and introduced into the tank 12 through the installation opening 80. This enables the fuel tank 12 to be produced in a particularly simple manner from shaped parts of simple construction by blow molding, deep drawing, injection molding or the like. Since the installation opening 80 is generally present in any case for the installation of an associated internal part 24 of the fuel tank 12, an additional structural outlay on the fuel tank 12 is avoided by the subsequent installation of the absorber assembly 14. As a result, the tank can be manufactured particularly cost-effectively while including a means for reducing fuel slosh noise.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A liquid tank assembly for a motor vehicle comprising:
a tank having an inner surface defining a cavity for receiving a liquid substance; and
an absorber assembly disposed within the cavity for dampening liquid sloshing noises, the absorber assembly including a plurality of connected dampener elements, end sections of the absorber assembly being attached to the inner surface of the tank,
wherein the absorber assembly is configured to float on a surface of the liquid when a volume of liquid within the tank is between a first critical volume which is less than a maximum volume of the tank and a second, lower critical volume which is greater than a minimum volume of the tank,
wherein the absorber assembly is generally submerged when a volume of liquid within the tank is a generally greater than the first critical volume and less than the maximum volume, and
wherein the absorber assembly is generally suspended within the cavity when a volume of liquid within the tank is a generally lower than the second critical volume and greater than the minimum volume.

2. The liquid tank assembly of claim 1, further comprising connecting members for attaching the end sections of the absorber assembly to side portions of the inner surface of the tank, the connecting members preventing the absorber assembly from engaging the inner surface of the tank.

3. The liquid tank assembly of claim 1, wherein the plurality of dampener elements has a specific density smaller than that of the liquid in the tank so as to float on the surface of the liquid at critical liquid volumes.

4. The liquid tank assembly of claim 1, wherein each dampener element of the plurality of dampener elements is generally spherical in shape.

5. The liquid tank assembly of claim 4, wherein at least one dampener element of the plurality of dampener elements is perforated.

6. The liquid tank assembly of claim 4, wherein at least a portion of at least one dampener element of the plurality of dampener elements is generally permeable to liquid flow.

7. The liquid tank assembly of claim 4, wherein at least one dampener element of the plurality of dampener elements is formed of a number of synthetic, intermingled fibers.

8. The liquid tank assembly of claim 1, wherein the absorber assembly further comprises a base including a plurality of spaced apart first and second interconnected elongated members, each dampener element of the plurality of dampener elements being secured at an intersection between one of the first elongated members and one of the second elongated members.

9. The liquid tank assembly of claim 8, wherein the absorber assembly is a unitary molded product.

10. The liquid tank assembly of claim 1, wherein the absorber assembly includes at least one cutout for positioning the absorber assembly around at least one internal part of the tank.

11. An absorber assembly for a fuel tank of a motor vehicle for reducing fuel slosh noise, the absorber assembly comprising:
a plurality of dampener elements for mitigating surface wave propagation, the plurality of dampener elements being linked together to form a matrix of dampener elements, the absorber assembly being suspended within a cavity defined by an inner surface of the tank via at least one connecting member such that the absorber assembly is spaced from the tank inner surface, the dampener elements having a specific density smaller than that of the fuel in the tank, the at least one connecting member configured so as to prevent the absorber assembly from contacting upper and lower surfaces of the tank and only allow the absorber assembly to float on a surface of the fuel at critical fuel volumes that are less than a maximum volume of the tank and greater than a minimum volume of the tank,
wherein the absorber assembly further comprises a base including a plurality of spaced apart first and second interconnected elongated members, each dampener element of the plurality of dampener elements being secured at an intersection between one of the first elongated members and one of the second elongated members.

12. The absorber assembly of claim 11, wherein the at least one connecting member attaches at least one outermost dampener element to a side portion of the inner surface of the tank, the at least one connecting member preventing the absorber assembly from engaging the inner surface if the tank.

13. The absorber assembly of claim 12, wherein the at least one connecting member has a predetermined length which only allows the absorber assembly to float on the fuel surface when a volume of fuel within the tank is between a first critical fuel volume and a second, lower critical fuel volume.

14. The absorber assembly of claim 11, wherein the plurality of dampener elements are generally spherical in shape.

15. The absorber assembly of claim 11, further including at least one cutout for positioning the absorber assembly around at least one internal part of the fuel tank.

16. The absorber assembly of claim 11, wherein the plurality of linked dampener elements has a mat-like configuration.

17. An absorber assembly for a fuel tank of a motor vehicle for reducing fuel slosh noise, the absorber assembly comprising:
a plurality of generally spherical, interconnected dampener elements having a mat-like configuration tethered within a cavity defined by an inner surface of the fuel tank to mitigate surface wave propagation; and
a plurality of tethers for attaching the interconnected dampener elements to side portions of the tank inner surface, the tethers preventing the dampener elements from contacting the side portions, a top portion and a bottom portion of the tank inner surface and allowing the dampener elements to float on the fuel surface when a volume of fuel within the tank is between a first critical fuel volume which is less than a maximum fuel volume of the tank and a second, lower critical fuel volume which is greater than a minimum volume of the tank,
wherein the absorber assembly is generally submerged when a volume of liquid within the tank is a generally greater than the first critical volume, and
wherein the absorber assembly is generally suspended within the cavity when a volume of liquid within the tank is a generally lower than the second critical volume.

18. The absorber assembly of claim 17, wherein the tethers have a predetermined tension which prevents the absorber assembly from contacting the top portion and the bottom portion of the inner surface of the tank.

19. The absorber assembly of claim 17, further comprising a net-like base including a plurality of intersecting first and second elongated members, each dampener element of the plurality of dampener elements being secured at an intersection between one of the first elongated members and one of the second elongated members.

20. The liquid tank assembly of claim 19, wherein the absorber assembly is a unitary molded product.

* * * * *